United States Patent
Faulkner

(10) Patent No.: US 11,239,574 B2
(45) Date of Patent: Feb. 1, 2022

(54) BONDING LINE ATTACHMENT

(71) Applicant: Crompton Technology Group, Ltd., Solihull (GB)

(72) Inventor: Dale Faulkner, Stourbridge (GB)

(73) Assignee: CROMPTON TECHNOLOGY GROUP LTD., Solihull (GB)

( * ) Notice: Subject to any disclaimer, the term of this patent is extended or adjusted under 35 U.S.C. 154(b) by 63 days.

(21) Appl. No.: 16/380,047

(22) Filed: Apr. 10, 2019

(65) Prior Publication Data
US 2019/0393621 A1   Dec. 26, 2019

(30) Foreign Application Priority Data

Jun. 22, 2018 (EP) .................................... 18275090

(51) Int. Cl.
| | | |
|---|---|---|
| *H01R 4/14* | (2006.01) | |
| *H01R 4/18* | (2006.01) | |
| *H01R 43/033* | (2006.01) | |
| *H01R 43/048* | (2006.01) | |
| *H01R 4/64* | (2006.01) | |

(52) U.S. Cl.
CPC ............. *H01R 4/14* (2013.01); *H01R 4/183* (2013.01); *H01R 43/033* (2013.01); *H01R 43/048* (2013.01); *H01R 4/64* (2013.01)

(58) Field of Classification Search
CPC ........ H01R 4/14; H01R 1/183; H01R 43/048; H01R 4/183; H01R 43/033
USPC ................................. 439/739, 427, 430, 884
See application file for complete search history.

(56) References Cited

U.S. PATENT DOCUMENTS

| | | |
|---|---|---|
| 1,813,417 A | 7/1931 | Noble |
| 5,447,625 A | 9/1995 | Roe |
| 5,634,827 A | 6/1997 | Francois et al. |
| 5,973,903 A | 10/1999 | Tomerlin |
| 8,400,749 B2 | 3/2013 | West et al. |
| 8,562,027 B2 | 10/2013 | Barre et al. |
| 8,654,499 B2 | 2/2014 | Petit et al. |
| 2006/0081003 A1 | 4/2006 | Machock |

FOREIGN PATENT DOCUMENTS

WO    2007042536 A1    4/2007

OTHER PUBLICATIONS

Extended European Search Report for International Application No. 18275090.1 dated Dec. 7, 2018, 8 pages.
Glenair, Safe-T-Cable The Complete Fastener Retention System, [retrieved on Apr. 10, 2019 (Apr. 10, 2019)]. Retrieved from the Internet:,URL:http://www.glenair.co.uk/safettooling.asp.

*Primary Examiner* — Arun Ramaswamy
(74) *Attorney, Agent, or Firm* — Cantor Colburn LLP

(57) ABSTRACT

A bonding wire conductively connected to a pipe having a pipe body and a conductive tab mounted to the pipe and having a hole therein, the bonding wire being in the form of a braided conductive cable provided with a connector at each of its ends, the bonding wire being tightly wound around the pipe body and the ends both passing through the hole in the connector such that the ends of the bonding wire extend away from the pipe body after passing through the hole, while a portion of the bonding wire between the end portions is wrapped tightly around the pipe body; the bonding wire held under tension around the pipe body by a crimp around the two end portions where they pass through the hole.

3 Claims, 3 Drawing Sheets

BONDING LINE ATTACHMENT

FOREIGN PRIORITY

This application claims priority to European Patent Application No. 18275090.1 filed Jun. 22, 2018, the entire contents of which is incorporated herein by reference.

TECHNICAL FIELD

The disclosure relates to protecting piping e.g. fuel pipes in aircraft against lightning or other electric sparks by means of a bonding wire.

BACKGROUND

Components in aircraft such as piping e.g. fuel pipes are often made of conductive materials. In electrical environments or in lightning storms, there is a risk of a build-up of static electricity on one component in comparison to another component to which it is connected—e.g. one fuel pipe section relative to another. Particularly in fuel lines, sparking due to this build-up of static can be extremely dangerous. In the case of a lightning strike, there is a need to avoid current flow between pipes. Conventionally, a so-called bonding lead or wire is electrically connected between the components to prevent static build-up. Bonding leads are usually made of highly conductive material to discharge electricity.

Bonding leads or wires, also known as grounding leads or wires, are described, for example, in U.S. Pat. Nos. 8,400,749, 8,562,027 and 5,973,903.

In current systems, electrical bonding wires are provided with eyelets or rings at their ends. The fuel pipes are usually composite tubes or pipes and the bonding wires are attached by winding them around the pipe under layers of composite material. The composite material is then cured to hold the wires in place. The crimped eyelets at the ends are bolted to earthing rings provided on the pipe. A resin compound is then applied all over the connection to protect and secure it. This procedure is unwieldy and results in a bulky, unattractive pipe appearance. The additional composite layers wrapped around to secure the leads also add to the size and weight of the pipe, which is clearly undesirable in aircraft.

There is a need for an improved bonding wire solution that is easier to install and provides a neater and more professional appearance to the bonded pipe.

SUMMARY

The present disclosure provides a bonding wire conductively connected to a pipe having a pipe body and a conductive tab mounted to the pipe and having a hole therein, the bonding wire being in the form of a braided conductive cable provided with a connector at each of its free ends, the bonding wire being tightly wound around the pipe body and the ends both passing through the hole in the connector such that end portions of the bonding wire extend away from the pipe body after passing through the hole, while a portion of the bonding wire between the end portions is wrapped tightly around the pipe body; the bonding wire held under tension around the pipe body by a crimp around the two end portions where they pass through the hole.

The free ends are preferably provided with a tab or eyelet for connection to adjoining components.

The conductive tab may be provided with eyelets for connection to ground.

The bonding wire can be wrapped one turn or several turns around the pipe body.

Where redundancy is required, as is often the case in aircraft, two bonding wires can be looped around the pipe body, each having its own crimp where the end portions meet.

The twisted wire is preferably a braided or twisted stainless steel cable. Such braided cables are available for various uses e.g. for securing fasteners such as nuts and bolts against undesired rotation and are available in different diameters. An example can be seen at http://www.glenair.co.uk/safettooling.asp. These cables are already approved for aerospace applications. Typically, these wires are twisted and secured under tension, perhaps using a special, available, tensioning tool and are often malleable and so hold their shape.

In one embodiment, the pipe connector tab has an upstanding portion provided with two openings, so that one end of the wound wire will pass through the hole and be secured there by a crimp and the other will pass through the hole and then through one of the openings where it will be secured by another crimp.

The bonding wire can also be die cast in place relative to the connection tab.

In another aspect, there is provided a method of attaching a bonding wire to a pipe, comprising winding a twisted or braided conductive cable, under tension, around the pipe body and passing the ends of the cable through a connection tab on the pipe and maintaining the tension be providing a crimp over the two end portions of the cable where they meet at the tab, the free ends of the cable beyond the crimp being provided with electric connectors for connection to other components.

The cable may be wound and crimped under tension using a tensioning tool.

DETAILED DESCRIPTION

Figure 1:
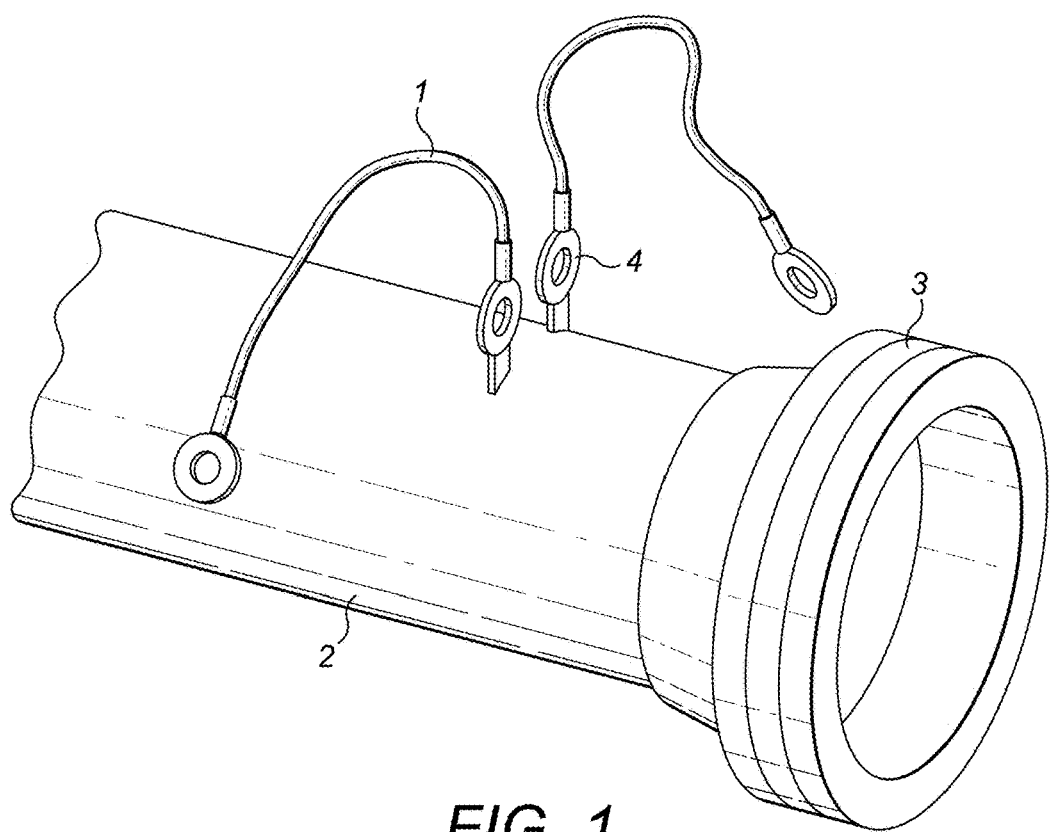
FIG. 1 is a perspective view of a conventional pipe and bonding wire arrangement.

Briefly referring to FIG. 1, as mentioned above, conventionally a bonding wire 1 is secured to a pipe 2, having an end fitting 3, by wrapping the wire around the pipe body several times while applying composite layers and then curing the entire structure. The wire ends 4 are attached to earthing rings by bolts and the fastening point is encased in a resin compound. The resulting pipe has a bulky, unprofessional appearance and the additional composite layers add to the size and weight of the pipe.

Figure 2:
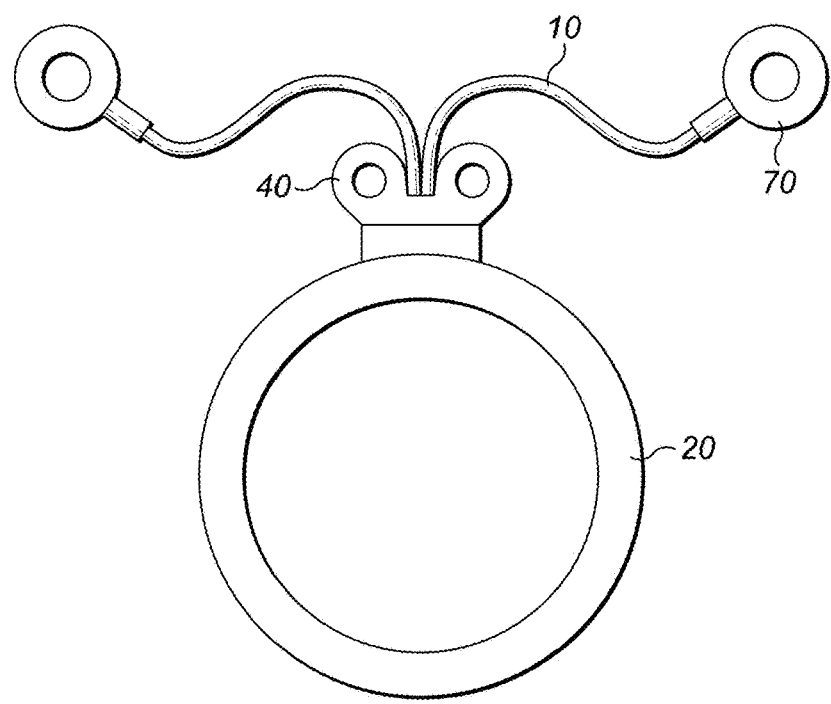
FIG. 2 is an end view of a pipe with a bonding wire attached according to this disclosure.
Figure 3:
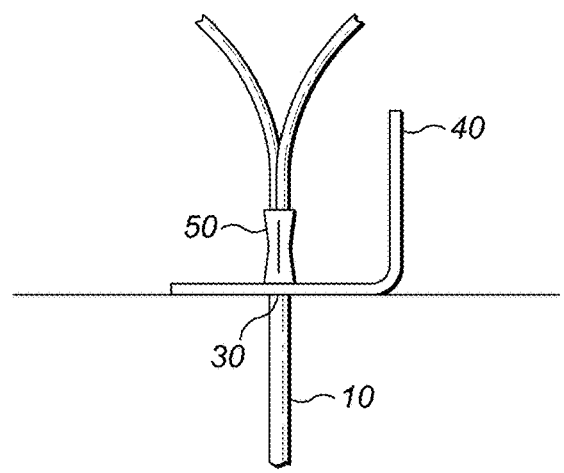
FIG. 3 is a side view of the connection tab area of FIG. 2.

According to the present disclosure, e.g. with reference to FIGS. 2 and 3, a twisted or braided cable 10 made, e.g. of strong, stranded conductive stainless steel, such as wires already known for securing fasteners against undesired rotation, is wound around the pipe body 20 under tension. The braid can be round or flat. This could be done while the composite layers are added or after they are cured. The crimping process applies appropriate tension to minimise movement through friction between the wire and pipe body. Conductive adhesive may also be applied to improve electrical flow but this is not essential. Put another way, the bonding wire can be installed "naked" over a finished pipe, i.e. after the composite layers have been cured, or it may be wrapped onto a layer of conductive adhesive provided over a cured or partially cured pipe, or it may be installed before the final layers of composite, and before curing. Where the ends of the cable 10 meet around the pipe, they pass through a hole 30 in a mounting tab 40 on the pipe 20. The tab 40 may be attached directly to the pipe body or can be attached to an end fitting that can be provided with the pipe or provided separately for attachment to the pipe. The attachment may be by, e.g., crimping, bonding, moulding or casting. Additive manufacture would allow complex shaped conductive tabs to be added.

A crimp 50 is forced down or crimped tightly around the two parts of the cable where they meet coming through the hole 30 in the tab to secure the loop formed by the cable and hold it under tension around the pipe. The tension is needed to ensure conduction.

The free ends of the cable can be provided with earthing rings, also referred to as connectors or eyelets, 70 for connection to other components.

Figure 4:
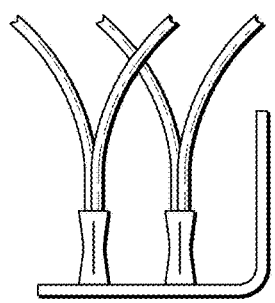
FIG. 4 is a view similar to that of FIG. 3 but where two bonding wires are provided.
Figure 5:
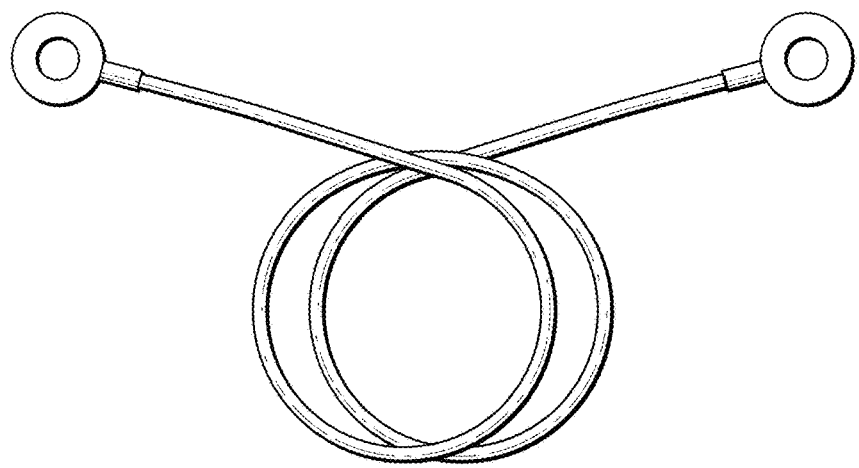
FIG. 5 shows how the bonding wire can be wound twice around the pipe (the pipe not shown).
Figure 6:
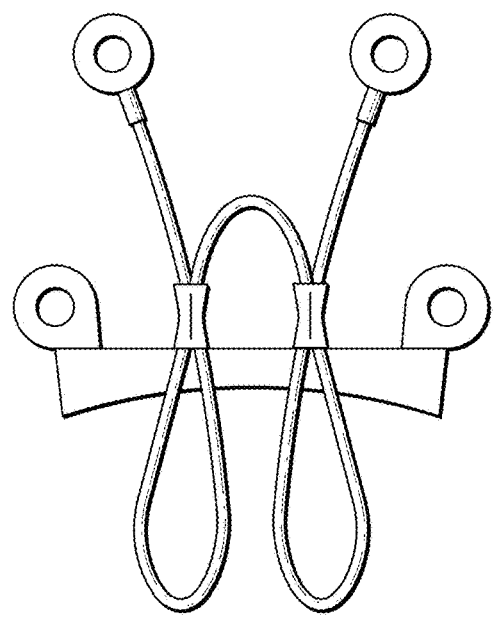
FIG. 6 shows how a wire wound twice around the pipe could be crimped at two locations (the pipe again not shown).

Whilst a single bonding wire will suffice to discharge built-up electricity, it can be preferable, where redundancy is required or desired, to wind two separate cables around the pipe, each secured by its own crimp at a respective hole in the tab (see FIG. 4) and/or for the cable(s) to be wound more than once around the pipe. FIG. 5 shows a double loop. FIG. 6 shows that even for one cable, wound as a double loop, two crimps may be provided.

Figure 7:
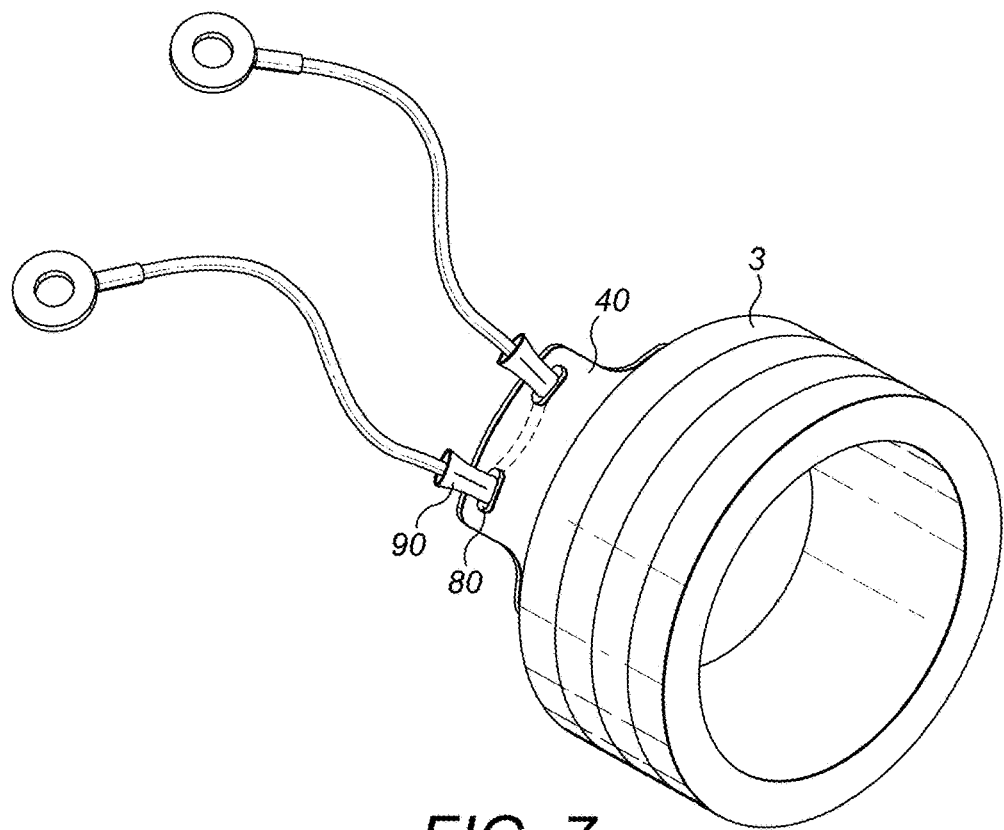
FIG. 7 is a perspective view of an embodiment of the bonding wire.

As shown in e.g. FIG. 7, the mounting tab 40 (here provided on the end fitting 3) may be formed with two (or more) openings 80 in the tab wall (a 'bunny ears' configuration). The ends of the bonding wire can, in embodiments, pass through the hole and then through the openings 80, where they can, again, be secured by crimps 90.

The bonding wire formed from a braided or twisted wire such as known for locking wires will be securely attached under tension to the pipe. If desired, for extra security or to provide a smooth finish, a conductive gel coating can be provided over the outer surface of the pipe and bonding wire. Conductive epoxy may also be applied to increase conductivity between the wire and the pipe body.

If desired, the free ends of the wire(s) can be shielded with additional tubing or flexible coatings to further increase corrosion resistance or service life.

The ends of the wires and the places where they pass through holes or openings are preferably crimped to prevent sharp wire edges sticking out.

Known crimp technology can be used to pull the wires taut and apply the crimps. If customised crimp fittings are used, some minor modifications to the tools may be needed.

The crimps and tabs can be readily available parts or can be custom made.

The pipes can be provided together with an end fitting or merely with a thread and an O-ring.

The solution taught here will provide a quicker, smaller and neater bonding wire attachment and existing wire and tools can be used.

The bonding wire solution will find application in many fields including aerospace, automotive, energy etc. fields.

The invention claimed is:

1. An assembly comprising:
   a bonding wire;
   a pipe having a pipe body; and
   a conductive tab mounted to the pipe body and having a hole therein,
   wherein the bonding wire is conductively connected to the pipe and being in the form of a braided or twisted conductive cable provided with a connector at each of its ends, the bonding wire being tightly wound around the pipe body and having first and second end that both pass through the hole in the mounting tab and extend away from the pipe body;
   wherein the bonding wire is held under tension around the pipe body by a crimp around both the first and second two ends where they have passed through the hole.

2. The assembly of claim 1, wherein the first and second ends are provided with a tab or eyelet for connection to adjoining components.

3. The assembly of claim 1, wherein the bonding wire is a braided or twisted stainless steel cable.

* * * * *